Oct. 11, 1966　　　　　K. C. CASKEY　　　　　3,277,985
AIR COOLED DISK BRAKES

Filed Nov. 6, 1964　　　　　　　　　　　　　2 Sheets-Sheet 1

INVENTOR.
Kenneth C. Caskey.
BY
Harness, Dickey & Pierce
ATTORNEYS.

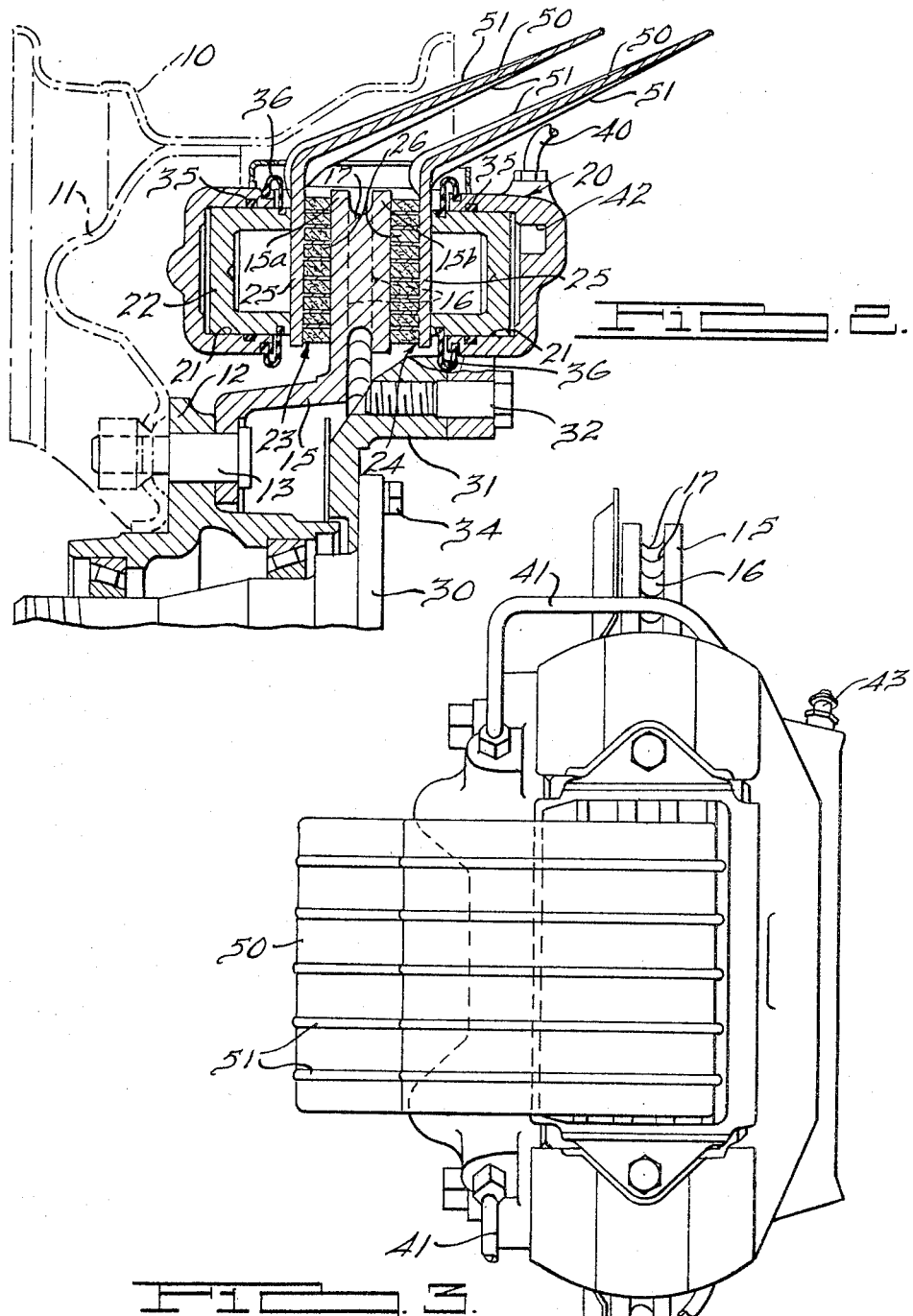

United States Patent Office 3,277,985
Patented Oct. 11, 1966

3,277,985
AIR COOLED DISK BRAKES
Kenneth C. Caskey, Livonia, Mich., assignor to Kelsey-Hayes Company, Romulus, Mich., a corporation of Delaware
Filed Nov. 6, 1964, Ser. No. 409,392
5 Claims. (Cl. 188—264)

This invention relates to brakes and, more particularly, to improvements in disk brakes adapted to render the same more efficient and improve the same generally.

One of the principal objects of this invention is to provide means for maintaining a lower, less destructive temperature in the brake shoes whereby the effective life of the brake shoes is prolonged, the coefficient of friction between the brake shoes and the disk is maintained at a desirable level, and vaporization of the brake fluid is avoided.

These objects of this invention are attained by providing each brake shoe with a heat dissipating member in the form of a cooling fin which will absorb heat from the brake lining and which extends from the backing plate of the brake shoe to an exposed position where it will readily give off its heat to the surrounding atmosphere or to the air stream flowing past the brake when the vehicle is in motion. These fins may be, and preferably are, provided with ribs to increase the exposed surfaces thereof. These cooling fins have a heat transmitting connection with the backing plates of the brake shoes and may be made separately therefrom and attached thereto, or may be made integral with the backing plates, as shown. These cooling fins provide an effective means for cooling the backing plate and the brake lining of the brake shoes and thus increase the life of the latter and provide a more uniform brake operation. The cooling fins function both as a heat sink to collect heat from the brake linings and as a heat dissipating medium, which, because of their exposed location, readily give up their heat to the surrounding atmosphere or to the air stream, if the vehicle is in motion.

The objects of this invention are accomplished by a construction which is so reduced in the number and character of its component parts as to approach the ultimate in structural simplicity to thereby create an economy in its manufacture, installation and maintenance costs.

The various objects and advantages, and the novel details of construction of one commercially practical embodiment of the invention will become more apparent as this description proceeds, especially when considered in connection with the accompanying drawings, in which:

FIGURE 2 is an enlarged fragmentary sectional view taken substantially on the plane indicated by line 2—2 in FIGURE 1, looking in the direction of the arrows;

FIGURE 3 is a plan view, looking from the left in FIGURE 1; and

Figure 1:
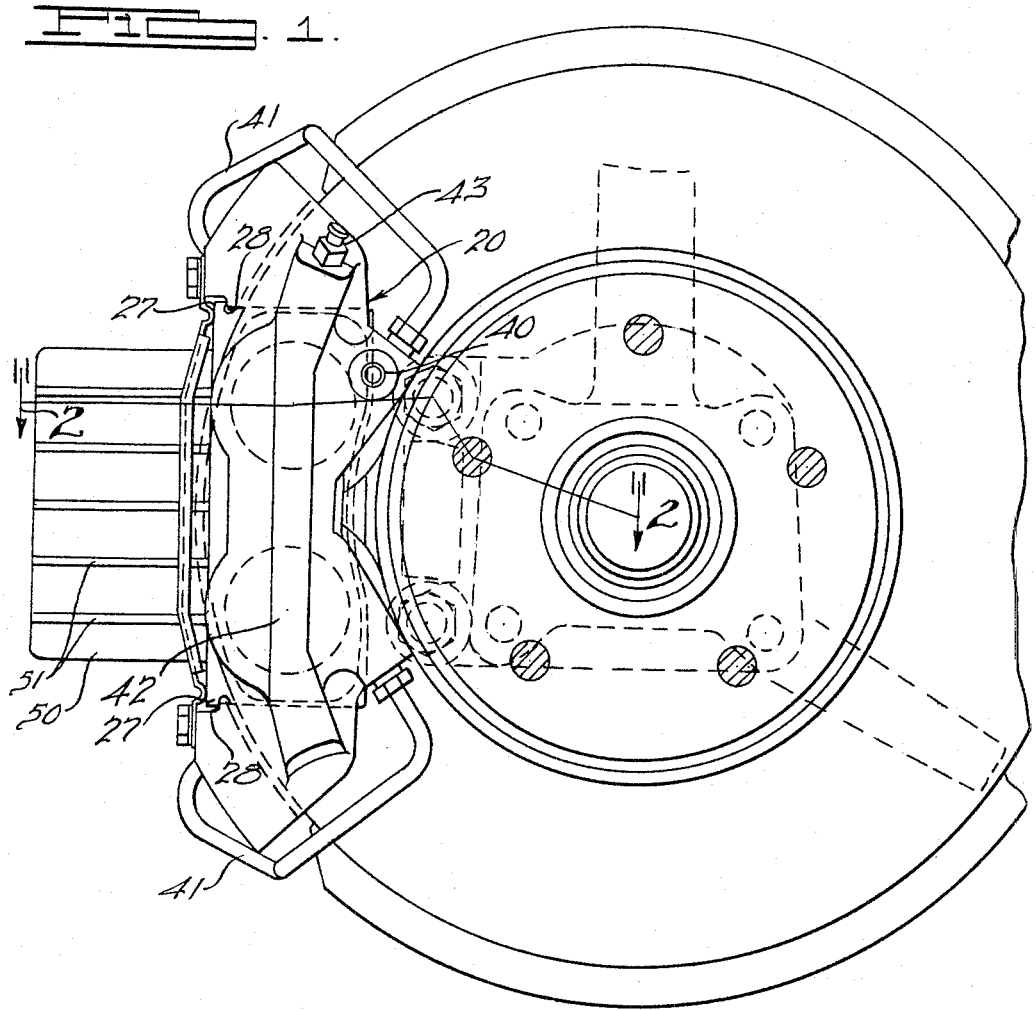
FIGURE 1 is an elevational view of a brake constructed in accordance with this invention, looking from the left of FIGURE 2, with the wheel removed.
Figure 4:
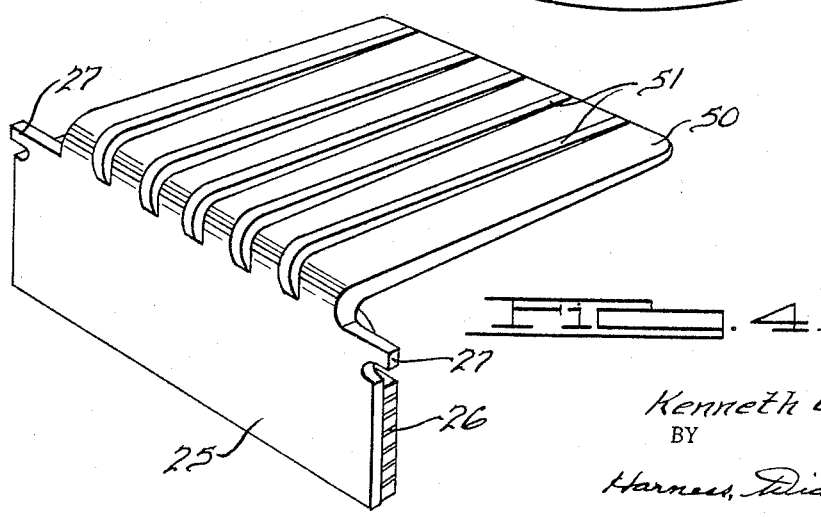
FIGURE 4 is a perspective view of one of the brake shoes with a cooling fin attached thereto.

The brake of this invention is shown as being associated with a vehicle wheel having a rim 10 and a wheel body 11 secured to the axle flange 12 by means of studs or bolt and nut assemblies 13.

Also secured to the axle flange 12, as for instance by means of the same stud or bolt and nut assemblies 13, is a brake disk 15. In the form of the invention illustrated, the brake disk is formed with a pair of spaced walls 15a and 15b. The brake is provided with a plurality of radially extending apertures or openings 16 and the webs 17 therebetween function as fan blades and serve to move cooling air in a radially outward direction between the walls 15a and 15b when the brake is rotated. This serves to reduce the heat generated by the engagement of the brake shoes with the brake disk, as will be will understood.

Enclosing a part only of the braking surface of the brake disk 15 is a caliper-like member 20 in the form of a housing or yoke member. As will be seen from FIGURE 2, the sides are spaced on opposite sides of the disk 15 and are shaped to provide opposed cylinders 21 in which the brake shoe actuating pistons 22 are disposed. These pistons engage brake shoes 23 and 24, each provided with a backing plate 25 and a friction lining 26. The friction linings 26 may be made of any suitable or desired material, but the type of brake linings illustrated in Wellman Patent 2,873,517 has been found to work satisfactorily. Each backing plate 25 is formed with a pair of ears 27 which engage ledges 28 on the housing 20 to slidably support the brake shoes.

The housing 20 is nonrotatably mounted on a fixed part 30 of the axle structure by means of a torque member 31 to which the housing 20 is attached by bolts 32. The torque member 31 is connected to the axle part 30 by means of bolts 34.

Each piston 22 is provided with an annular seal 35 which may be and preferably is in the form of an O-ring. This restricts free movement of the pistons 22 and also seals the periphery thereof. Also, a flexible annular boot 36 formed of rubber, canvas, or any other suitable flexible material may be provided to close the clearance between the pistons 22 and the cylinders 21 to exclude therefrom dust or other foreign material.

Fluid may be introduced into the cylinders 21 behind the pistons 22 by means of a fluid pressure inlet 40. The reference character 41 indicates one or more conduits connecting the cylinders 21 on one side of the device with the cylinders on the other side so that fluid under pressure may simultaneously be admitted to both sets of cylinders. Also, the cylinders are connected by an interior conduit 42 to a bleed opening 43 whereby the system may be freed from trapped air.

While one particular form of disk brake has been illustrated and described, it will be immediately obvious that any desired or preferred type of brake construction may be employed which includes brake shoes of the backing plate-lining type.

The subject matter of the present invention consists in providing the brake shoes with cooling fins having a good heat transmitting connection with the brake shoe. In the form of the invention herein illustrated, there is shown a cooling fin 50 associated with each backing plate. These fins 50 may be made separately and attached to the backing plates with a heat transmitting connection, or they may be made integral with the backing plates, as shown in the drawings. Each fin 50 is preferably formed of a relatively thin sheet of copper or aluminum and one or both surfaces thereof is provided with ribs 51 to increase the surface area thereof. The fins 50 extend substantially laterally from the backing plates 25 so as to clear the rim 10 and to extend into the air stream flowing past the brake and increase the rate of heat dissipation when the vehicle is in motion. Thus, the heat generated in the backing plates 25 when the brakes are applied is transmitted to the fins 50 and is dissipated to the atmosphere in a highly efficient manner. As shown, the cooling fins 50 extend axially beyond the wheel.

It has been found in practice that the fins provide an effective means for preventing vaporization of the brake fluid under many conditions where braking ability would be completely lost as a result of such vaporization. Also, the fins serve to cool the brake linings 26 and thus increase the life of the brake linings and provide a more uniform brake operation.

While the cooling fins 50 have been described as being made of copper or aluminum, they may obviously be made of any other suitable material and, as stated, they may either be made integral with the backing plates 25 or may be made separate therefrom and attached thereto with a good heat transmitting connection as, for instance, by being welded thereto. In any event, the cooling fins 50 have been proved to provide an effective means of cooling the brake shoes and thus improve the operation of the brakes.

While one commercially practical embodiment of the invention has been described and illustrated herein somewhat in detail, it will be understood that various changes may be made as may come within the purview of the accompanying claims.

What is claimed is:

1. In a disk brake for vehicle wheels having a brake disk rotatable with the wheel, a yoke member straddling a portion of said brake disk and closely spaced from said wheel, a brake shoe slidably and removably mounted on said yoke member, and a brake actuating piston carried by said yoke member adapted to actuate said brake shoe, that improvement which comprises, a cooling fin having a heat transmitting connection with said brake shoe, said cooling fin extending from said brake shoe and through the space between said yoke and said wheel to a location axially beyond said wheel exposed to the surrounding atmosphere.

2. In a disk brake for vehicle wheels having, a brake disk rotatable with the wheel and spaced radially inwardly of the rim of said wheel, a yoke member straddling a portion of said brake disk, a brake shoe slidably and removably mounted on said yoke member, and a brake actuating piston carried by said yoke member adapted to actuate said brake shoe, that improvement which comprises, a cooling fin having a heat transmitting connection with said brake shoe and extending substantially through the space between the wheel rim and the yoke member to a location axially beyond said wheel exposed to the surrounding atmosphere.

3. In a disk brake for vehicle wheels having, a brake disk rotatable with the wheel, a yoke member straddling a portion of said brake disk, a brake shoe slidably and removably mounted on said yoke member, said brake shoe comprising a backing plate and a lining, and a brake actuating piston carried by said yoke member adapted to actuate said brake shoe, that improvement which comprises, a cooling fin having a heat transmitting connection with said backing plate and extending from said backing plate between said yoke and said wheel and axially beyond said wheel into the air stream flowing past the brake when the vehicle is in motion.

4. In a disk brake for vehicle wheels having, a brake disk rotatable with the wheel, a yoke member straddling a portion of said brake disk, a brake shoe slidably and removably mounted on said yoke member, said brake shoe comprising a backing plate and a lining, and a brake actuating piston carried by said yoke member adapted to actuate said brake shoe, that improvement which comprises, a cooling fin integrated with said backing plate, said cooling fin extending from said backing plate between said yoke and said wheel and axially beyond said wheel so as to project into the air stream flowing past the brake when the vehicle is in motion.

5. In a disk brake for vehicle wheels having, a brake disk rotatable with the wheel, a yoke member straddling a portion of said brake disk, a brake shoe slidably and removably mounted on said yoke member, said brake shoe comprising a backing plate and a lining, and a brake actuating piston carried by said yoke member adapted to actuate said brake shoe, that improvement which comprises, a cooling fin integrated with said backing plate and extending substantially throughout the length thereof, said cooling fin extending from the backing plate between said yoke and said wheel and axially beyond said wheel so as to project into the air stream flowing past the brake when the vehicle is in motion, and ribs on said cooling fin whereby to increase the surface area thereof.

References Cited by the Examiner

UNITED STATES PATENTS

| | | | |
|---|---|---|---|
| 1,717,522 | 6/1929 | Rosenberg | 188—264 |
| 2,655,237 | 10/1953 | Benson | 188—26 |
| 3,013,636 | 12/1961 | Dotto et al. | 188—73 X |
| 3,113,643 | 12/1963 | Botterill | 188—73 |

FOREIGN PATENTS 191,119    8/1937    Switzerland.

MILTON BUCHLER, *Primary Examiner.*

FERGUS S. MIDDLETON, *Examiner.*

G. E. A. HALVOSA, *Assistant Examiner.*